United States Patent [19]

Keller

[11] 3,798,472

[45] Mar. 19, 1974

[54] MONOLITHIC INTEGRABLE FLIP FLOP CIRCUIT

[75] Inventor: Hans Keller, Freiburg i, Germany

[73] Assignee: ITT Industries, Inc., New York, N.Y.

[22] Filed: Oct. 31, 1972

[21] Appl. No.: 302,617

[30] Foreign Application Priority Data

Dec. 4, 1971 Germany ........................... 2160260

[52] U.S. Cl. ............................. 307/291, 307/299 A

[51] Int. Cl. ............................................. H03k 3/286

[58] Field of Search ......................... 307/291, 299 A

[56] References Cited

UNITED STATES PATENTS

| | | | |
|---|---|---|---|
| 2,885,574 | 5/1959 | Roesch, Jr. | 307/291 |
| 2,997,605 | 8/1961 | Fortini | 307/291 |
| 3,671,946 | 6/1972 | Aagaard | 307/291 X |

*Primary Examiner*—John Zazworsky

*Attorney, Agent, or Firm*—John T. O'Halloran; Menotti J. Lombardi, Jr.; Vincent Ingrassia

[57] ABSTRACT

This invention relates to a monolithic integrable flip flop circuit which provides for information storage and reliable switchover by inserting a transistor between the base and collector of the control transistor of the flip flop. The circuit is improved by providing each control transistor with an additional collector connected to the base of the control transistor of the other flip flop half. Alternatively, the collector of the coupling transistor is connected to the base of the control transistor of the other flip flop half.

6 Claims, 3 Drawing Figures

MONOLITHIC INTEGRABLE FLIP FLOP CIRCUIT

CROSS REFERENCES TO RELATED APPLICATIONS

This invention represents an improvement over the circuit described in co-pending application Ser. No. 81,710, entitled "Monolithic Integrable Flip Flop Circuit," filed Oct. 19, 1970 by the same inventor and assigned to the assignee of the present application.

BACKGROUND OF THE INVENTION

The present invention relates to a monolithic integrable bistable flip flop circuit consisting of two halves which are designed in the same way, each comprising a switching transistor and a control transistor of the same conductivity type, with the collectors thereof as well as the emitters thereof being connected together and applied to a reference potential. The base of the switching transistor associated with one flip flop half is connected to the collector of the switching transistor associated with the other flip flop half, via an operating resistor applied to the operating voltage, and the base electrodes of the control transistors are connected to a common control input via respective coupling capacitors.

Accordingly, this flip flop circuit consists of two NOR-stages each with two inputs of which respectively the one input, the base electrode of the switching transistor, is connected to the output (the collector electrode of the switching transistor) of the other stage. The second input (the base electrode of the control transistor) is connected via a capacitor, to the control input respectively.

In order to provide for a reliable switchover of this type of flip flop circuit when triggered by input pulses, the information relating to the former switching condition is stored in the capacitors.

As is evident from French Pat. No. 1,548,137, this can be accomplished in that both the output and the control input of each flip flop half are coupled together by a resistor. Since this coupling resistor must have a relatively high value to provide the storage function, a large surface portion of the semiconductor body must be used for its fabrication within a monolithic integrated circuit.

Instead of ohmic resistors, it is also possible to use semiconductor diodes. However, the forward voltage of these diodes must be as low as possible, and at least lower than the base-emitter threshold voltage of the control transistors. When using a circuit employing individual components, this is accomplished by using different semiconductor materials for the transistors and the diodes. Thus, it is possible to use silicon as a semiconductor material for the transistors, and germanium as the semiconductor material for the diodes, wherein the forward voltage drop of the emitter base diode of the silicon transistor is approximately 0.6 volts and the forward voltage drop of a germanium diode is approximately 0.3 volts.

Since all the components and structures in the monolithic body are made from the same material, the fabrication of diodes having lower forward voltage drops then the emitter base diodes of the transistors is impractical.

To provide for reliable switchover from one state to the next, and according to the teachings of the co-pending application Ser. No. 81, 710, filed Oct. 19, 1970, now U.S. Pat. No. 3,678,300 and entitled "Monolithic Integrable Flip Flop Circuit," the collector and emitter of a complementary auxiliary transistor is respectively connected to the base and collector of the control transistor of each flip flop half, and the base of the complementary auxiliary transistor is coupled to either ground potential or the base of the respective switching transistor of each flip flop half. In this manner, the information relating to the former stable state is stored for a certain period of time as a charge difference in the coupling capacitors. This charge difference in the two capacitors is due to the fact that the capacitors associated with the blocked flip flop half, is charged via the auxiliary transistor of this flip flop half which, in this case, is conductive while the auxiliary transistor associated with the current-conductive flip-flop half, is blocked, so that the capacitor of this particular flip flop half is discharged to a considerable, but undefined value.

SUMMARY OF THE INVENTION

It is an object of the present invention to provide an improved integrable semiconductor circuit of the type described above wherein the potential at the base of the control transistor of the current conducting flip flop half, in the discharge state of the associated capacitor, assumes a small and defined value.

According to a broad aspect of the invention there is provided an improved monolithic integrated flip flop circuit including a first and second identical section, each section containing a switching transistor and a control transistor, said switching transistor and control transistor having emitter, base and collector regions and electrodes, the emitter, base and collector regions of said switching transistor being of the same conductivity type as the respective emitter, base and collector regions of said control transistors, the collector electrode of said switching transistor being connected to the collector electrode of said control transistor, the emitter electrodes of said switching and control transistors being connected together and coupled to a reference potential, the base electrodes of said switching transistor associated with said first section being connected to the collector electrode of the switching transistor associated with said second section, the collector electrode of said control and switching transistors of each section being coupled to an operating potential via a respective collector resistor, the base electrode of said control transistor of each section being coupled to a common control input, and wherein there is provided a complementary auxiliary transistor having an emitter, base and collector electrode included in each of said first and second sections, the emitter and collector electrodes of each transistor being coupled respectively to the base and collector electrodes of the control transistor associated with the same section, wherein the improvement comprises an additional control transistor collector in each flip flop half connected directly to the base electrode of the control transistor in the other flip flop half.

The above and other objects of the present invention will be more clearly understood from the following detailed description taken in conjunction with the accompanying drawings in which:

DESCRIPTION OF THE PREFERRED EMBODIMENT

Figure 1:
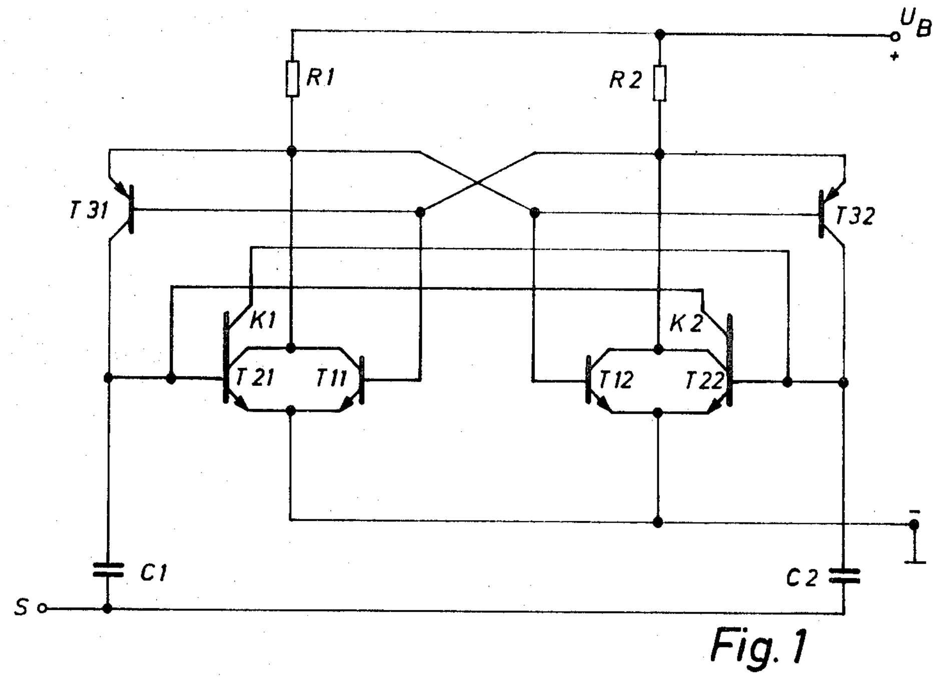
FIG. 1 is a circuit diagram of one embodiment of the invention.

Referring to FIG. 1, the base electrode of the respective switching transistors $T_{11}$ or $T_{12}$ is connected directly to the base electrode of the respective complementary auxiliary transistors $T_{31}$ or $T_{32}$ respectively.

The flip flop circuit shown consists of two symmetrical halves each of which contains the switching transistor $T_{11}$ or $T_{12}$ and the control transistor $T_{21}$ or $T_{22}$ respectively. The collector electrodes in each half are connected together, and the emitter electrodes in each half are likewise connected together. The parallel coupled collector electrodes are connected, across the operating resistor $R_1$ or $R_2$, to the supply (operating) voltage $+U_B$, while the parallel coupled emitters are connected to a reference potential. One flip flop half, represents a NOR-circuit, with the base electrodes of the control transistors and of the switching transistors serving as the two inputs of the NOR-stage. The outputs are constituted by the parallel arranged collectors.

The base electrode of the switching transistor of one flip flop half is connected to the parallel arranged collector electrodes of the other flip flop half. Between the control terminal S and the base electrodes of the control transistors $T_{21}$ and $T_{22}$ of each flip flop half there is arranged one capacitor $C_1$ or $C_2$ through which the input signals are applied to the flip flop stage.

As already mentioned, the two auxiliary transistors $T_{31}$ or $T_{32}$ which are complementary to the switching and control transistors, serve to effect a reliable switching from one stable state into the other stable state, with care being taken that for switchover, information concerning the former stable state is stored for a certain period of time as a charge difference in capacitors $C_1$ and $C_2$. Each of the auxiliary transistors $T_{31}$ or $T_{32}$ is connected with its collector electrode to the base electrode of the associated control transistor $T_{21}$ or $T_{22}$, and with its base electrode to the collector electrode of the switching transistor of the other flip flop half. The emitter electrode of each auxiliary transistor is coupled to the collector electrode of the associated switching transistor $T_{11}$ or $T_{12}$ respectively.

The additional collector $K_1$ of control transistor $T_{21}$ is connected directly to the base electrode of control transistor $T_{22}$ while the additional collector $K_2$ of the control transistor $T_{22}$ is connected directly to the base electrode of the control transistor $T_{21}$.

Figure 2:
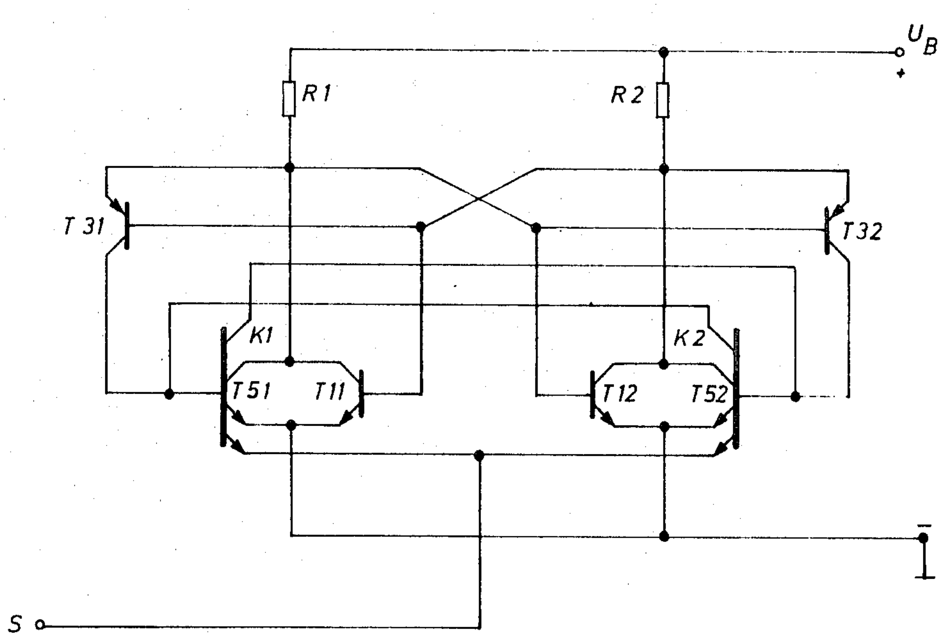
FIG. 2 is a further embodiment of the inventive circuit according to FIG. 1.

In FIG. 2, capacitor $C_1$ and $C_2$ have been replaced by additional emitter-base-pn-junctions of the control transistor which, is shown in FIG. 2 as a double emitter type transistor $T_{51}$ or $T_{52}$ respectively. These double-emitter type transistors likewise contain the additional collectors $K_1$ or $K_2$ which are respectively connected to the base electrodes of the double-emitter type transistor of the other flip flop half.

Figure 3:
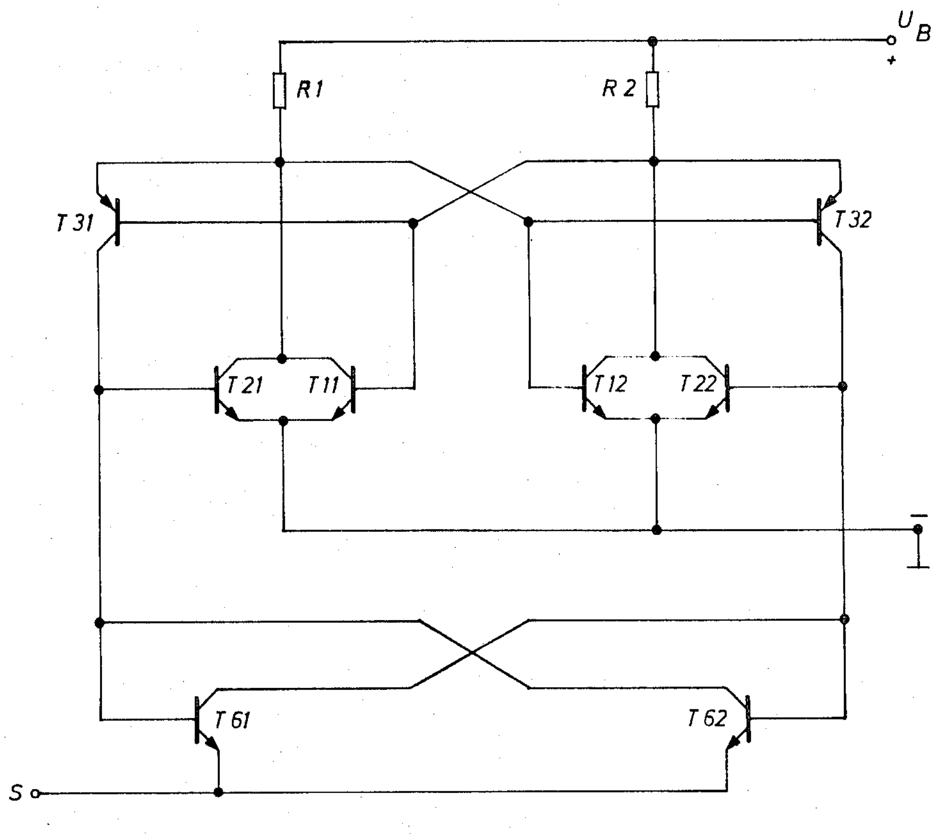
FIG. 3 is a circuit diagram of another embodiment according to the invention.

FIG. 3 shows an alternative solution according to the invention. In this embodiment the collector electrode of the coupling transistor is connected to the base electrode of the control transistor of the other flip flop half. In this way the collector electrode of transistor $T_{61}$ is applied to the base electrode of the control transistor $T_{22}$ while the collector electrode of the coupling transistor $T_{62}$ is connected to the base electrode of the transistor $T_{21}$. The inventive circuits represent a safeguard to see that the capacitor belonging to the switched on flip flop half is discharged to a defined extent for at least the time duration of the input pulse, which discharge is already initiated outside the duration of the input pulse by a withdrawal of current. A further advantage of the invention resides in the fact that in the case of a monolithic integration of the inventive flip flop circuit there is enabled a more favorable arrangement of the individual transistors.

It is to be understood that the foregoing description of specific examples of this invention is made by way of example only and is not to be considered as a limitation on its scope.

I claim:

1. An improved monolithic integrated flip-flop circuit including a first and second identical section, each section containing a switching transistor and a control transistor, said switching transistor and control transistor having emitter, base and collector regions and electrodes, the emitter, base and collector regions of said switching transistor being of the same conductivity type as the respective emitter, base and collector regions of said control transistors, the collector electrode of said switching transistor being connected to the collector electrode of said control transistor, the emitter electrodes of said switching and control transistors being connected together and coupled to a reference potential, the base electrodes of said switching transistor associated with said first section being connected to the collector electrode of the switching transistor associated with said second section, the collector electrode of said control and switching transistors of each section being coupled to an operating potential via a respective collector resistor, the base electrode of said control transistor of each section being coupled to a common control input, and wherein there is provided a complementary auxiliary transistor having an emitter, base and collector electrode included in each of said first and second sections, the emitter and collector electrodes of each auxiliary transistor being coupled respectively to the collector and base electrodes of the control transistor associated with the same section, and wherein a capacitor is provided in each section coupled between said common control input and the base of the control transistor in the same section, wherein the improvement comprises:

an additional control transistor collector in each flip-flop section connected directly to the base electrode of the control transistor of the other flip-flop section.

2. An improved monolithic integrated flip-flop circuit including a first and second identical section, each section containing a switching transistor and a control transistor, said switching transistor and control transistor having emitter, base and collector regions and electrodes, the emitter, base and collector regions of said switching transistor being of the same conductivity type as the respective emitter, base and collector regions of said control transistors, the collector electrode of said switching transistor being connected to the collector electrode of said control transistor, the emitter electrodes of said switching and control transistors being connected together and coupled to a reference potential, the base electrodes of said switching transistor associated with said first section being connected to the collector electrode of the switching transistor associated with said second section, the collector electrode of said control and switching transistors of each section being coupled to an operating potential via a respective collector resistor, the base electrode of said control transistor of each section being coupled to a common control input, and wherein there is provided a complementary auxiliary transistor having an emitter, base and collector electrode included in each of said first and second sections, the emitter and collector electrodes of each auxiliary transistor being coupled respectively to the collector and base electrodes of the control transistor associated with the same section, and wherein a capacitor is provided in each section coupled between said common control input and the base of the control transistor in the same section, wherein the improvement comprises:

a coupling transistor having an emitter, base and collector electrode included in each flip-flop section, said collector electrode coupled to the base electrode of said control transistor and said coupling transistor in the other flip-flop section.

3. A flip flop circuit according to claim 1 wherein said capacitor is comprised of a pn-junction operated in the reverse direction.

4. A flip-flop circuit according to claim 3 wherein each section further comprises a coupling transistor having a base electrode connected to the base electrode of the control transistor in the same section, said coupling transistor having an emitter electrode connected to said common control input and said coupling transistor having a collector electrode connected to the base electrode of the control transistor associated with the other flip-flop section.

5. A flip flop circuit according to claim 4 wherein said control transistor and said coupling transistor are combined to form one double-emitter transistor.

6. A flip flop circuit according to claim 1 wherein the base electrode of each auxiliary transistor is respectively coupled to the base electrode of the switching transistor associated with the same section.

* * * * *